W. H. GAGE.
Basket.
No. 211,984.  Patented Feb. 4, 1879.
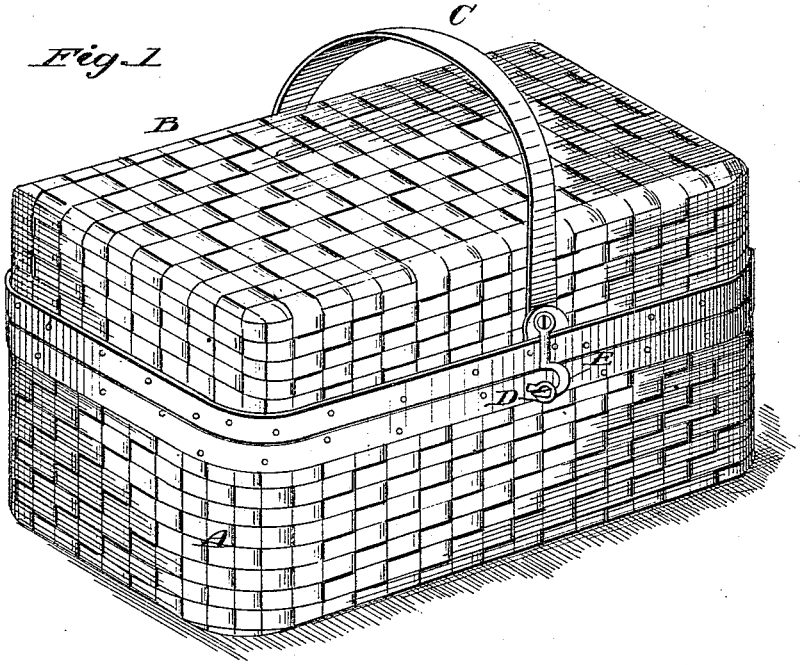
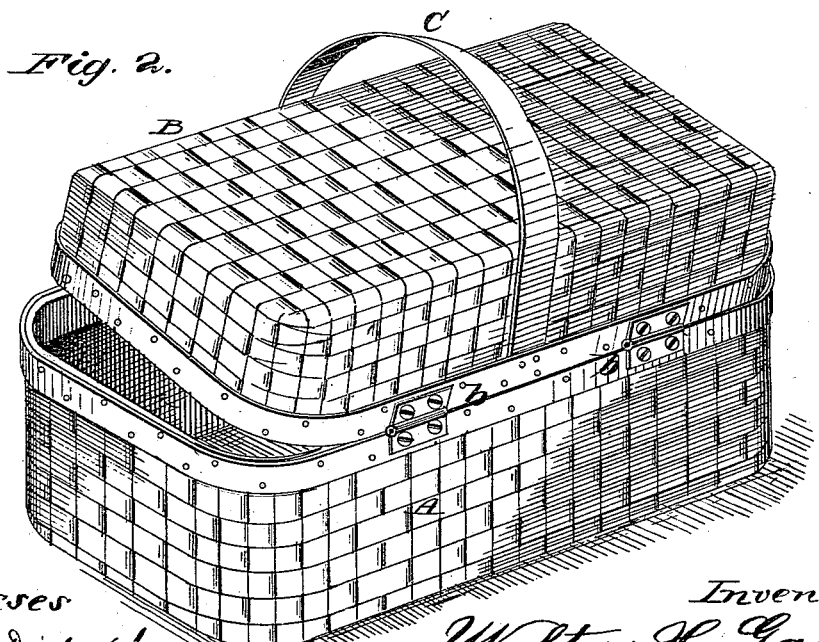
Witnesses  Inventor
Fred. G. Dietrich  Walter H. Gage,
Jno. P. Brooks  pr. C. A. Snow
 attorneys

UNITED STATES PATENT OFFICE.

WALTER H. GAGE, OF BELLOWS FALLS, VERMONT.

IMPROVEMENT IN BASKETS.

Specification forming part of Letters Patent No. 211,984, dated February 4, 1879; application filed September 5, 1878.

*To all whom it may concern:*

Be it known that I, WALTER H. GAGE, of Bellows Falls, in the county of Windham and State of Vermont, have invented certain new and useful Improvements in Baskets; and I do hereby declare that the following is a full, clear, and exact description of the invention, which will enable others skilled in the art to which it appertains to make and use the same, reference being had to the accompanying drawings, which form a part of this specification.

Figure 1 is a view, in perspective, of a basket embodying the improvements in this invention; and Fig. 2 is a view, in perspective, showing the cover turned up.

This invention has relation to baskets; and consists in the improvements in the construction of the same, hereinafter fully described, and particularly pointed out in the claim.

In the accompanying drawings similar letters of reference indicate like parts in the figures.

The body or base A of the basket has the lid B hinged thereto by hinges $b\ b$, and the handle C is secured to opposite sides of the lid or cover B, as shown. An eye, D, screwed into the body A receives the hook E, pivoted to the lid B, and when the hook and eye are connected the basket may be carried by the handle.

Heretofore the handle has been connected to the body of the basket, making it inconvenient to insert large articles into the basket, and necessitating some means of fastening the lid to the basket that has occasioned great inconvenience in removing and replacing it.

I am aware that handles have before been applied to hinged and hooked covers, such as is the case, for instance, with the ordinary so-called "cash-boxes," which have handles secured to the tops of their covers.

By securing the handle to opposite sides of the cover I gain greater strength, and enable the handle to be more firmly secured. The basket having the handle thus attached may also be conveniently carried upon the arm in the usual manner, which is especially desirable when heavy weights are carried.

The basket herein shown and described is not only neat and cheap, but it is far more convenient than any that have been heretofore placed upon the market.

Having thus fully described my invention, what I claim as new and useful, and desire to secure by Letters Patent, is—

As an article of manufacture, the improved basket herein described, consisting of the body A, having hinged cover B, provided with handle C, rigidly attached to opposite sides of the cover, and the hook and eye D E, when constructed and operating substantially as and for the purpose herein shown and specified.

In testimony that I claim the foregoing as my own I have hereto affixed my signature in presence of two witnesses.

WALTER HOWARD GAGE.

Witnesses:
WM. P. GAGE,
FRANCIS A. BOLLES.